United States Patent [19]
Cirone

[11] Patent Number: 6,004,033
[45] Date of Patent: Dec. 21, 1999

[54] WATER BOTTLE HOLDER SYSTEM WITH ATTACHMENT MECHANISM

[75] Inventor: Dominick Cirone, Scottsdale, Ariz.

[73] Assignee: Iron Gloves, Inc., Scottsdale, Ariz.

[21] Appl. No.: 09/126,230

[22] Filed: Jul. 30, 1998

[51] Int. Cl.⁶ .................................................. B65D 33/14
[52] U.S. Cl. ............................ 383/24; 383/11; 224/901.8
[58] Field of Search ..................... 224/483, 674, 224/675, 148.1, 148.4, 148.5, 148.6, 148.7, 901, 901.8, 926; 383/11, 24

[56] References Cited

U.S. PATENT DOCUMENTS

| | | |
|---|---|---|
| 4,176,770 | 12/1979 | Griggs et al. . |
| 4,220,302 | 9/1980 | Hampton et al. . |
| 4,282,279 | 8/1981 | Strickland . |
| 4,345,704 | 8/1982 | Boughton . |
| 4,418,733 | 12/1983 | Kallman ............................ 224/901.8 X |
| 4,420,104 | 12/1983 | Dilenno ................................ 224/674 X |
| 4,548,375 | 10/1985 | Moss . |
| 4,596,970 | 6/1986 | Adkins . |
| 4,634,089 | 1/1987 | Wright et al. . |
| 4,690,300 | 9/1987 | Woods . |
| 4,708,254 | 11/1987 | Byrns . |
| 4,718,623 | 1/1988 | McClure . |
| 4,721,276 | 1/1988 | Moss . |
| 4,779,831 | 10/1988 | Anderson . |
| 4,796,937 | 1/1989 | Andrea . |
| 4,848,625 | 7/1989 | Lucia . |
| 4,951,910 | 8/1990 | March . |
| 4,955,516 | 9/1990 | Satterfield . |
| 5,007,566 | 4/1991 | Fick . |
| 5,042,770 | 8/1991 | Louthan . |
| 5,048,734 | 9/1991 | Long ................................... 224/675 X |
| 5,110,020 | 5/1992 | Uhl . |
| 5,199,678 | 4/1993 | Luebke . |
| 5,249,770 | 10/1993 | Louthan . |
| 5,299,720 | 4/1994 | Koch, III . |
| 5,325,991 | 7/1994 | Williams . |
| 5,344,055 | 9/1994 | Edwards . |
| 5,381,922 | 1/1995 | Gladman et al. . |
| 5,390,887 | 2/1995 | Campbell . |
| 5,425,484 | 6/1995 | Kawand et al. . |
| 5,427,285 | 6/1995 | Kreitzman . |
| 5,443,192 | 8/1995 | Hodges et al. .................... 224/901.8 X |
| 5,464,183 | 11/1995 | McConnell et al. . |
| 5,494,248 | 2/1996 | Pratt et al. . |
| 5,497,920 | 3/1996 | Moeller et al. . |
| 5,503,316 | 4/1996 | Stewart . |
| 5,622,346 | 4/1997 | Story, Jr. . |
| 5,806,730 | 9/1998 | Deno ....................................... 24/148.6 |

*Primary Examiner*—Jes F. Pascua
*Attorney, Agent, or Firm*—Hunton & WIlliams

[57] ABSTRACT

A neoprene water bottle holder formed by sewing a first edge of a sheet of neoprene material to a second edge of the sheet of material to form a generally cylindrical shaped water bottle holder with a Velcro™ attachment mechanism to enable the water bottle holder to be conveniently and easily selectively attached to and removed from a piece of exercise equipment or other structure.

6 Claims, 2 Drawing Sheets

WATER BOTTLE HOLDER SYSTEM WITH ATTACHMENT MECHANISM

FIELD OF THE INVENTION

The present invention relates to neoprene water bottle holders attachment mechanisms for attaching the water bottle to exercise equipment or other structures, and more particularly to water bottle holders using hook and loop (e.g., Velcro™) or magnetic attachment mechanisms.

BACKGROUND

Various types of holders for bottles, such as bottles for holding water or other fluids are known. For convenience, these various bottle types will be referred to as water bottles, although it is to be understood that such bottles may be used to hold other types of fluids and materials. Water bottles are often used by a person during an exercise session or at other times.

Examples of water bottle holders are shown in U.S. Pat. Nos. 5,494,248 and 4,345,704. Each of these prior water bottle holders suffers from various drawbacks. One drawback of some prior water bottle holders is that they require a rigid mounting bracket. This is undesirable for several reasons, including cost, the need to mechanically secure the rigid bracket, the difficulty in moving the water bottle from one structure to another (e.g. one piece of exercise equipment to another). Other drawbacks also exist.

DETAILED DESCRIPTION OF THE PREFERRED EMBODIMENTS

Figure 1:
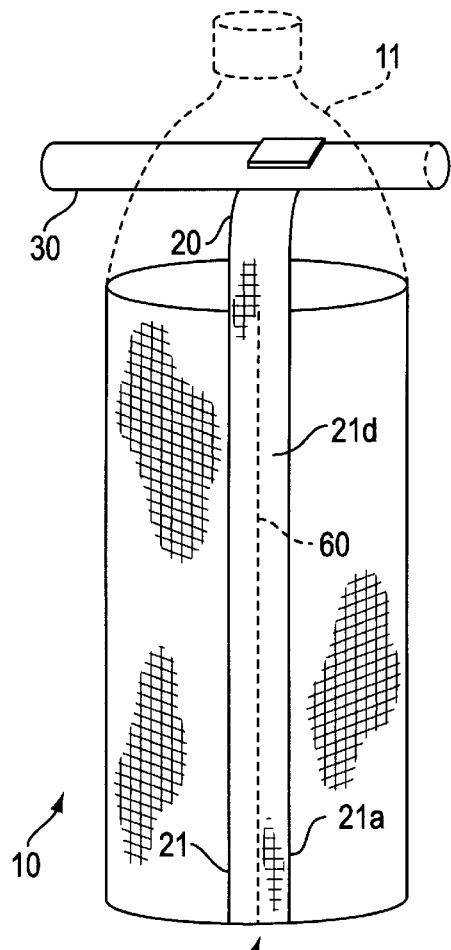
FIG. 1 is a schematic illustration of a water bottle holder with an attachment mechanism according to one embodiment of the present invention.

FIG. 1 illustrates a water bottle holder 10, with a water bottle 11 (shown in phantom) located therein, an attachment mechanism 20 and a portion of a piece of exercise equipment 30 (or other structure), only a portion of which is schematically illustrated in FIG. 1. According to one aspect of the invention, the attachment mechanism 20 attaches the water bottle holder 10 to the portion of a piece of exercise equipment 30 (or other structure) in such a manner as to permit the rapid and easy connection and disconnection of water bottle holder 10 to and from the piece of exercise equipment 30 (or other structure). Also, the attachment mechanism 20 may attach the water bottle holder 10 to a person's clothing, for example. Preferably the water bottle holder 10 is made of neoprene or other suitable material and the attachment mechanism comprises a hook and loop (e.g., Velcro™) system. The attachment mechanism may also comprise a plurality of magnets. However, other types of material and attachment mechanisms may be used.

According to one embodiment of the invention, the attachment mechanism 20 includes a first portion 21 and a second portion 22. First portion 21 is securely attached to the water bottle holder 10. Second portion 22 is attached or attachable to the element 30. Preferably, the first portion 21 comprises a first strip of either hook or loop material. A first end 21a of the first portion 21 is securely attached to the water bottle holder 10 at a first attachment location on the water bottle holder 10. For example, the first attachment location may be substantially adjacent to a bottom portion 50 of the water bottle holder 10. Preferably, the first end 21a is attached to the water bottle holder 10 by stitching. Alternatively, the first end 21a may be attached by adhesive or a combination of stitching, adhesive or other attachment techniques.

Figure 1A:
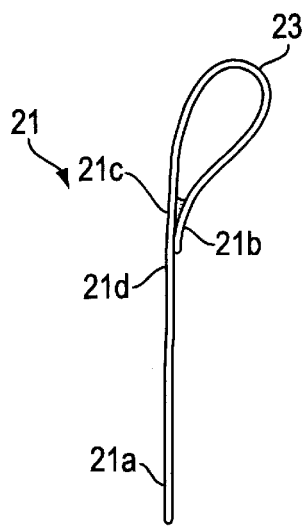
Figures 1A and 1B are a partial schematic illustrations of a side view of aspects of he embodiment of FIG. 1.
Figure 1B:
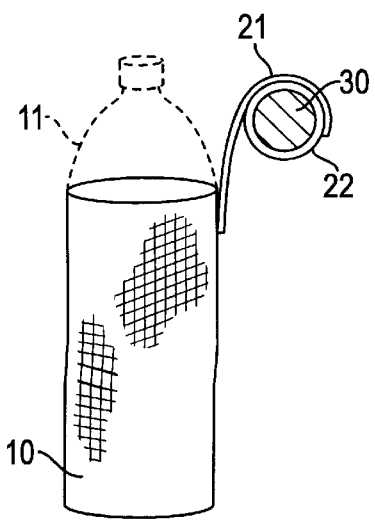
Figure 2:
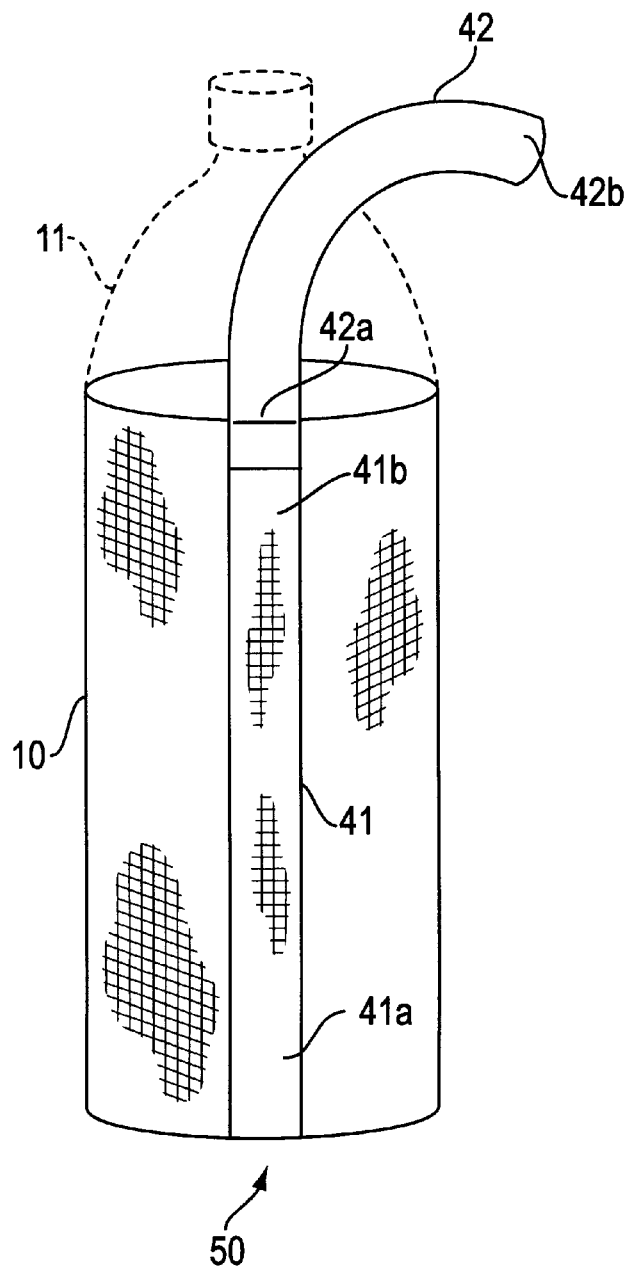
FIG. 2 is a schematic illustration of a neoprene water bottle holder according to another embodiment of the present invention.
Figure 2A:
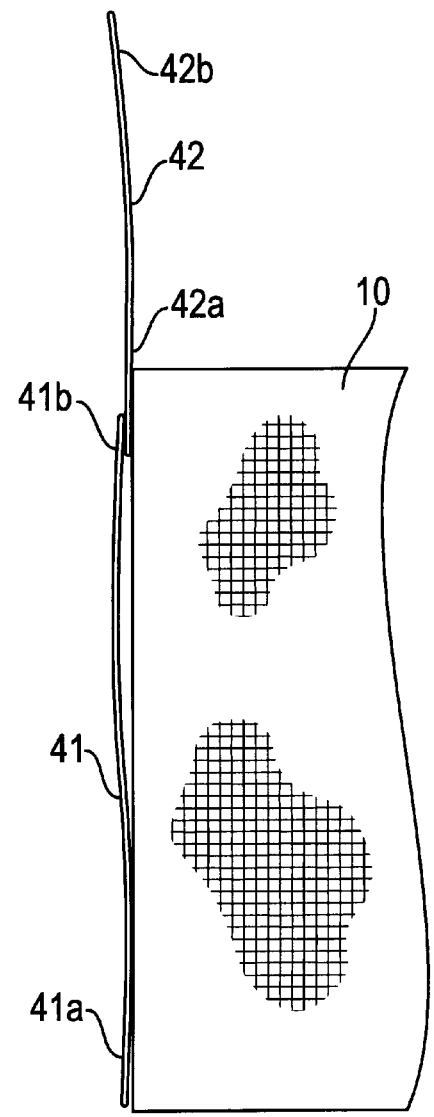
FIG. 2A is a partial schematic view of the embodiment of FIG. 2.

In one possible configuration, a second end 21b of the first portion 21 is folded over (as shown for example in FIG. 1A) forming a loop 23. Preferably, the second end 21b and an intermediate portion 21c of the first portion 21 are attached to each other and to a second attachment location 21d on the water bottle holder 10. Preferably, the second attachment location 21d is adjacent an upper edge of the water bottle holder 10.

Preferably, the second portion 22 of the attachment mechanism 20 is a strip of either hook or loop material, depending on the type of the first portion 21. If the first portion 21 is hook material, the second portion 22 preferably comprises loop material and vice versa. Preferably, the second portion 22 is attached to or selectively attachable to the piece of exercise equipment 30 or other structure. For example, the second portion may be adhesively attached to the piece of equipment 30 or it may be selectively attached by looping the second portion 22 around the equipment 30.

In use, according to one embodiment, the water bottle holder 10 can be attached to the equipment 30 by attaching the second portion 22 to the equipment (e.g. the handle bars of a exercise bike, and pressing the first portion 21 against the second portion 22. One advantage this embodiment is that by holding the water bottle (or the first portion between the first and second attachment locations) with one hand, a user can use a "whip" action to cause the free end of the first portion 21 to wrap at least partially around and connect to the second portion 22. This aspect of this embodiment is particularly useful where the equipment 30 includes a generally cylindrical portion (e.g., handlebars of a bike, etc.). The water bottle holder 10 may be removed from the equipment by simply pulling the water bottle holder with sufficient force to disconnect the first portion 21 from the second portion 22.

One advantage the embodiment with a loop 23 in first portion 21 is that the loop 23 allows for alternative mounting of the water bottle holder 10. For example, a belt or strap can be passed through loop 23 allowing the water bottle holder 10 to hang therefrom. The belt or strap could be worn on the waist of the user or could comprise part of a purse, gym bag, back pack, golf club bag or the like.

While the looped embodiment of the present invention is not so limited, preferably, the first portion 21 is approximately 2 inches wide and approximately 15 inches long, with the loop 23 being about 5 inches long. However, other actual and relative dimensions may be used according to the particular bottle holder and equipment 30 or structures to which the bottle holder is attached.

One advantage of using a selectively attachable second portion 22 (e.g., one that is easily removable) is that a person who uses more than one piece of exercise equipment (or other structure) can easily attach a water bottle to one piece of equipment and then easily remove the water bottle from that piece of equipment and then attach the water bottle to another piece of exercise equipment. For example, if desired, the second portion 22 of the attachment mechanism 20 can be easily connected to one piece of exercise equipment that a user is using. When the user is finished with that piece of equipment, the second portion 22 of can be removed from that piece of equipment and moved to another piece of equipment. Similarly, the user can connect and disconnect the second portion 22 to other structures.

According to one aspect of the invention, the water bottle holder 10 is preferably made of Neoprene or other suitable material. For example, other elastomeric or insulating materials may be used. One advantage of Neoprene is that it both insulates the contents of a water bottle located therein and conforms to the shape of the water bottle. Other materials may be used to provide either or both or other properties.

According to another embodiment, a first portion 41 of an attachment mechanism has a first end portion 41a and a second end portion 41b. The second portion 42 of the attachment mechanism has a first end portion 42a and a second end portion 42b. The first 15 end portion 41a of the first portion 41 is attached to the water bottle holder 10 at a first attachment location. Preferably this point of attachment is substantially adjacent a bottom portion 50 of the water bottle holder 10. The second end portion 41b of the first portion 41 and the first end portion 42a of the second portion 42 are attached to a second attachment location on the water bottle holder 10. Preferably the second attachment location is substantially adjacent an upper edge of the water bottle holder 10. Second end portion 42b of the second portion 42 is left unattached to (i.e., free from) the water bottle holder 10. If desired the first portion 41 may also be attached to the water bottle holder 10 at additional attachment locations.

Preferably, the first portion 41 comprises a first strip of either hook or loop material. Preferably, the second portion 42 of the attachment mechanism is a second strip of either loop or hook material, depending on the type of the first portion 41. If the first portion 41 is hook material, the second portion 42 preferably comprises loop material and vice versa.

In operation, the unattached portion (i.e., end portion 42b of the second portion 42) can be wrapped around a piece of exercise equipment or other structure and easily attached to the first portion 41 to secure the water bottle holder 10 to a piece of exercise equipment.

The water bottle holder 10 may be formed in a variety of ways. According to a preferred embodiment, a sheet of Neoprene (or other suitable material) having a first edge and a second edge is formed into a water bottle holder by sewing, or adhesively attaching, the first and second edges together. Additionally, a preferably rubber, generally circular shape material, such as neoprene, for example, may be adhesively (or otherwise) connected to a bottom portion 50 of the water bottle holder 10 to form a bottom surface thereof. In an alternative embodiment the bottom edges of the neoprene sheet can be sewn or adhesively connected together to form a pouch like shape. In these manners, the water bottle holder 10 may receive and retain a water bottle within the water bottle holder, and a positive stop position is provided to prevent the water bottle from being pushed through the water bottle holder.

Preferably, the attachment portions (e.g., 21 and 41) described above are attached over the seam 60 formed by connecting the first edge and second edge of the sheet of Neoprene. Other locations may be used for attachment of these portions.

The foregoing describes the preferred embodiments of the prevent invention. A number of variations within the scope of the invention will be readily apparent in light of the foregoing description. For example, the use of Velcro™ material may be replaced by other material that is self-attaching or which has complimentary portions that connect or otherwise cooperate to provide a selectively attachable connection. Any orientation, geometric description or configurations described or shown is illustrative only. Various orientations, geometries and configurations are capable of being used with the novel concepts of the invention.

I claim:

1. A bottle holder system for attaching a bottle holder to a structure, said system comprising:

a bottle holder;

a first attachment member attached to the bottle holder, said first attachment member comprising a strip of material having a first and a second end;

a second attachment member attachable to the structure to which the bottle holder is to be attached and to which the first attachment member can be selectively removably attached;

wherein said first end of the strip is attached to a first attachment location on the bottle holder;

wherein said second end of the strip is folded over and aligned with and attached to an intermediate portion of the first attachment member to form a loop; and wherein said second end of the strip and the intermediate portion are attached to a second attachment location on the bottle holder.

2. The bottle holder system of claim 1 wherein said bottle holder comprises a sheet of material attached together to form a seam; and wherein said first attachment member is attached to the bottle holder substantially along said seam.

3. The bottle holder system of claim 2 further comprising a positive stop located at an end of said bottle holder; and wherein said positive stop assists in retaining a bottle within said bottle holder.

4. The bottle holder system of claim 3 wherein said positive stop comprises a generally circular piece attached to said sheet of material.

5. The bottle holder system of claim 4 wherein said generally circular piece comprises rubber.

6. The bottle holder system of claim 2 wherein said sheet of material comprises neoprene.

* * * * *